United States Patent
Murata et al.

(10) Patent No.: US 9,476,519 B2
(45) Date of Patent: *Oct. 25, 2016

(54) POSITIONER

(71) Applicant: Azbil Corporation, Tokyo (JP)

(72) Inventors: Kouichirou Murata, Tokyo (JP);
Yousuke Inagaki, Tokyo (JP); Hiroaki Nagoya, Tokyo (JP)

(73) Assignee: AZBIL CORPORATION, Tokyo (JP)

(*) Notice: Subject to any disclaimer, the term of this patent is extended or adjusted under 35 U.S.C. 154(b) by 15 days.

This patent is subject to a terminal disclaimer.

(21) Appl. No.: 14/642,821

(22) Filed: Mar. 10, 2015

(65) Prior Publication Data
US 2015/0260304 A1    Sep. 17, 2015

(30) Foreign Application Priority Data

Mar. 11, 2014    (JP) ................. 2014-047229

(51) Int. Cl.
*F16K 37/00*    (2006.01)
*F16K 27/00*    (2006.01)

(52) U.S. Cl.
CPC .......... *F16K 37/0041* (2013.01); *F16K 27/00* (2013.01); *G05B 2219/33326* (2013.01)

(58) Field of Classification Search
CPC .................................................. F16K 37/0066
USPC ...................... 251/129.01, 129.04; 137/487.5
See application file for complete search history.

(56) References Cited

U.S. PATENT DOCUMENTS

| 8,955,821 | B2 | 2/2015 | Okuda et al. |
| 2003/0183791 | A1* | 10/2003 | Meinhof ............... F16K 31/126 251/129.04 |
| 2011/0245982 | A1 | 10/2011 | Inagaki |
| 2012/0248356 | A1 | 10/2012 | Okuda et al. |
| 2013/0327426 | A1 | 12/2013 | Nomiyama et al. |
| 2014/0005960 | A1 | 1/2014 | Anderson et al. |

FOREIGN PATENT DOCUMENTS

| JP | D1128492 | 12/2001 |
| JP | 2012-207756 | 10/2012 |

OTHER PUBLICATIONS

Extended European Search Report dated Aug. 4, 2015 issued in corresponding European Patent Application No. 15157616.2.

* cited by examiner

*Primary Examiner* — Kevin Murphy
*Assistant Examiner* — Paul J Gray
(74) *Attorney, Agent, or Firm* — Troutman Sanders LLP

(57) ABSTRACT

In a positioner, a control calculating portion and a valve opening detecting portion are contained within a first case, and an electropneumatic converting portion and a pneumatic circuit portion are contained within a second case. The first case, which contains the control calculating portion and the valve opening detector, is assembled together with the valve, and the second case, which contains the electropneumatic converting portion and the pneumatic circuit portion, is located in a position away from the valve. A control signal MV, which is a PWM signal (a digital signal), is sent through a cable from the control calculating portion to the electropneumatic converting portion.

3 Claims, 11 Drawing Sheets

FIG. 5

|  | Single-Unit Type | Conventional Separated Type | Calculating/Pneumatic Separated Type |
|---|---|---|---|
| Positional Relationship between the Valve and the First Pressure Sensor | Bad: Far | Good: Near | Good: Near |
| Structure/Size | Bad: Large, Complex | Good: Small | Very Good: Small, Simple Structure |
| Noise | Good: Same As Conventional | Bad: Week | Good: Same As Conventional |
| Cables | Good: Not Required | Bad: Added | Good: Digital Communication/ Wireless |

FIG. 9

|  | Single-Unit Type | Conventional Separated Type | Calculating/Pneumatic Separated Type |
|---|---|---|---|
| Positional Relationship between the Valve and the First Pressure Sensor | Good: Near | Bad: Far | Good: Near |
| Structure/Size | Bad: Large, Complex | Good: Small | Very Good: Small, Simple Structure |
| Noise | Good: Same As Conventional | Bad: Week | Good: Same As Conventional |
| Cables | Good: Not Required | Bad: Added | Good: Digital Communication/ Wireless |

POSITIONER

CROSS REFERENCE TO RELATED APPLICATION

This application claims priority under 35 U.S.C. §119 to Japanese Patent Application No. 2014-047229, filed on Mar. 11, 2014, the entire content of which being hereby incorporated herein by reference.

FIELD OF TECHNOLOGY

The present invention relates to a positioner for controlling the opening of a valve.

BACKGROUND

Conventionally, positioners for controlling the openings of valves have been, for example, positioners wherein the critical components have been configured as illustrated in FIG. 10, for example. See, for example, Japanese Unexamined Patent Application Publication No. 2012-207756. In this figure, 100 is a higher-level device, 200 (200A) is a positioner, and 300 is a regulator valve.

The positioner 200A is provided with a control calculating portion 1, an electropneumatic converting portion 2, a pneumatic circuit portion 3, and a valve opening detector (valve opening detecting portion) 4, assembled together with a valve 300. In the below, this positioner 200A will be termed a "single-unit positioner."

In this single-unit positioner 200A, the valve opening detector 4 detects the current degree of opening of the valve 300, and sends it as an actual opening signal Xpv to the control calculating portion 1. The control calculating portion 1 uses, as inputs, the opening setting signal Xsp for the valve 300, sent from the higher-level device, and the actual opening signal Xpv, from the valve opening detector 4, to calculate the difference between the opening setting signal Xsp and the actual opening signal Xpv, and generates, and sends to the electropneumatic controlling portion 2, a PWM signal (a pulse width modulation signal), obtained through performing PID control calculations on this difference, as a control signal MV.

The electropneumatic converting portion 2 converts into an air pressure (a nozzle back pressure) Pn the control signal MV from the control calculating portion 1. The pneumatic circuit portion 3 uses the pneumatic signal Pn from the electropneumatic converting portion 2 as an input air pressure and amplifies this input air pressure Pn to produce an output air pressure Po, and outputs it to the operating device (not shown) of the valve 300. Doing so causes the air of the air pressure Po to flow into a diaphragm chamber within the operating device, to adjust the opening of the valve 300.

Note that the control calculating portion 1 is provided with a function for performing diagnostics on the valve 300, based on the changes in the control state, for sending the diagnostic results to the higher-level device 100, etc.

In this single-unit positioner 200A a control calculating portion 1, an electropneumatic converting portion 2, a pneumatic circuit portion 3, and a valve opening detector (valve opening detecting portion) 4 are contained within a single case 10, and this case 10 is assembled together with a valve 300. Because of this, there is a difficulty in that there is a susceptibility to the effects of vibrations of the valve 300 and a sensitivity to the temperature of the fluid that flows through the valve 300.

Given this, in order to reduce the susceptibility to the effects of vibration and temperature, a positioner 200 (200B), as illustrated in FIG. 11, is proposed wherein the case 10 is divided into a first case 10-1 and a second case 10-2, wherein the valve opening detector 4 is contained within the first case 10-1, and assembled together with the valve 300, where the control calculating portion 1, the electropneumatic converting portion 2, and the pneumatic circuit portion 3 are contained within the second case 10-2 and disposed at a location that is away from the valve 300. See, for example, Japanese Design Registration No. 1128492. In the below, this positioner 200B will be termed a "separated-type positioner."

Note that the actual opening signal Xpv from the valve opening detector 4, contained within the first case 10-1, are sent to the control calculating portion 1 through the provision of a terminal block 5 in the second case 10-2, where this terminal block 5 and the valve opening detector 4 are connected through a cable 6.

However, in this separated-type positioner 200B, the actual opening signal Xpv (which is a weak analog current signal) from the valve opening detector 4 is susceptible to the effects of noise due to the cable 6 that extends between the valve opening detector 4 and the control calculating portion 1. This causes problems such as the following to occur.

(1) The effects on control are large due to performing control calculations using the actual opening signal Xpv, which is susceptible to the effects of noise.

(2) It is necessary to test the noise at the terminal because the control calculating portion 1 is connected to the valve opening detector 4 by the cable 6 through the terminal block 5. Additionally, performing surge protection, and the like, at the terminal requires the positioner to be larger. There is also the possibility that the signal itself will be affected through the additional components after surge protection.

(3) Noise testing must be performed on the signal line for the actual opening signal Xpv, which transmits minute changes.

(4) Because the valve opening detector 4 is separated from the control calculating portion 1, temperature correction on the valve opening detector 4 is difficult.

(5) While there is no need for an anti-explosive structure in the second case 10-2 if it is placed in a safety zone, doing so requires the cable 6 between the valve opening detector 4 and the terminal block 5 to be longer, increasing the effects of noise on the actual opening signal Xpv.

The present invention was created to solve such a problem, and an aspect thereof is to provide a positioner that is robust to the effects of noise.

SUMMARY

The present invention, in order to achieve such an aspect set forth above, is a positioner including: a control calculating portion that inputs an opening setting signal for a valve, sent from a higher-level device, and an actual opening signal expressing the current opening of the valve, and that generates a control signal from the opening setting signal and the actual opening signal; an electropneumatic converting portion that converts the control signal from the control calculating portion into an air pressure; a pneumatic circuit portion that uses, as an input air pressure, an air pressure that has been converted by the electropneumatic converting portion, for amplifying this input air pressure to form an output air pressure, and outputs this output air pressure to the valve; and a valve opening detecting portion that detects the current opening of the valve to produce an actual opening signal for the control calculating portion. The positioner further includes: a first case that contains the control calculating portion and the valve opening detecting portion; and a second case that contains the electropneumatic converting portion and the pneumatic circuit portion. The first case is assembled together with the valve. The second case is located in a position away from the valve.

In the present invention, the control calculating portion and the valve opening detecting portion are contained within a first case, and the electropneumatic converting portion and the pneumatic circuit portion are contained within a second case, wherein the first case is assembled together with the valve and the second case is placed in a position that is away from the valve. In this case, a control signal may be sent from a control calculating portion, which may be contained within the first case, to the second calculating portion, which may be contained within the second case, and this control signal may be sent as a signal that is not susceptible to the effects of noise, such as a digital signal or a strong analog signal, through the control calculating portion.

Note that in the present invention, a vibration sensor may be contained within the first case, and this vibration sensor may send, as a detected vibration signal to the control calculating portion, the detected vibration that has propagated to the first case, and, in the control calculating portion, a diagnostic may be performed on the valve based on the detected vibration signal from the vibration sensor. Furthermore, a pressure sensor may be contained within the first case, and this pressure sensor may send, as a detected air pressure signal to the control calculating portion, the output air pressure from the pneumatic circuit at the valve, and, in the control calculating portion, a diagnostic may be performed on the valve based on the detected air pressure signal from the pressure sensor.

In the present invention, the control calculating portion and the valve opening detecting portion are contained within a first case, and the second calculating portion, the electropneumatic converting portion and the pneumatic circuit portion are contained in a second case, where the first case is combined with the valve and the second case is placed in a location away from the valve, and a control signal such as a digital signal or a strong analog signal is sent from the control calculating portion, contained within the first case, to the electropneumatic converting portion, contained within the second case, thereby making it possible to reduce the susceptibility to the effects of noise.

BRIEF DESCRIPTIONS OF THE DRAWINGS

FIG. 5 is a diagram showing comparisons of various aspects of a conventional positioner that is provided with a vibration sensor (a "single-unit positioner" and a "conventional separated-type positioner") and a vibration sensor-equipped positioner according to the present invention.

FIG. 9 is a diagram showing comparisons of various aspects of a conventional positioner that is provided with a pressure sensor (a "single-unit positioner" and a "conventional separated-type positioner") and a pressure sensor-equipped positioner according to the present invention.

DETAILED DESCRIPTION

Examples according to the present disclosure will be explained below in detail, based on the drawings.

EXAMPLE

Figure 1:
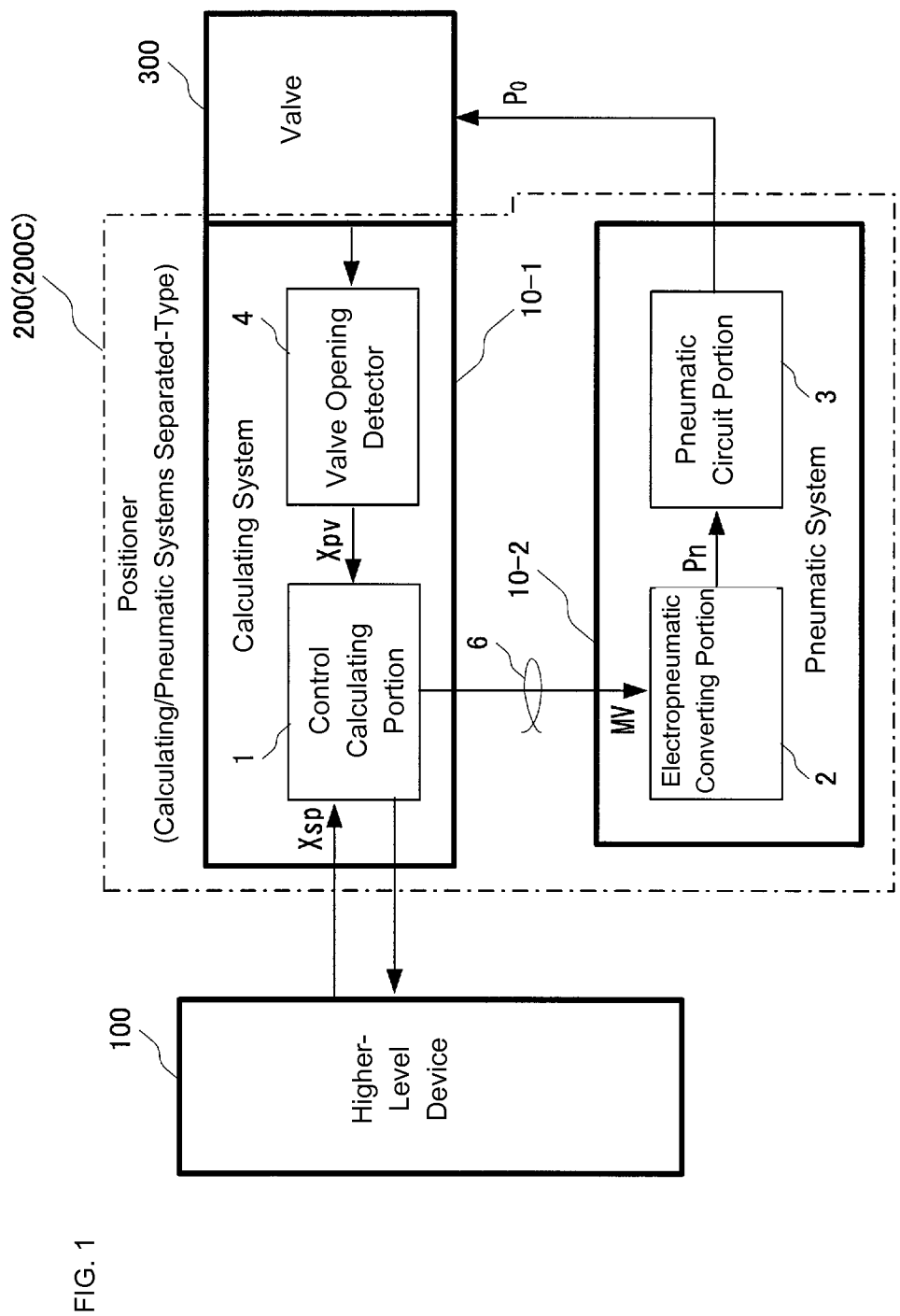
FIG. 1 is a structural diagram illustrating the critical components of Example of a positioner according to the present disclosure.

FIG. 1 is a structural diagram illustrating the critical components of Example of a positioner according to the present disclosure. In this figure, the structural elements that are identical or equivalent to the structural elements explained in reference to FIG. 11 are indicated by codes that are identical to those of FIG. 11, and explanations thereof are omitted.

In a positioner 200 (200C) according to the Example, a control calculating portion 1 and a valve opening detector (valve opening detecting portion) 4 are contained within a first case 10-1, and an electropneumatic converting portion 2 and a pneumatic circuit portion 3 are contained within a second case 10-2.

The first case 10-1, which contains the control calculating portion 1 and the valve opening detector 4, is assembled together with the valve 300, and the second case 10-2, which contains the electropneumatic converting portion 2 and the pneumatic circuit portion 3, is located in a position away from the valve 300.

Figure 11:
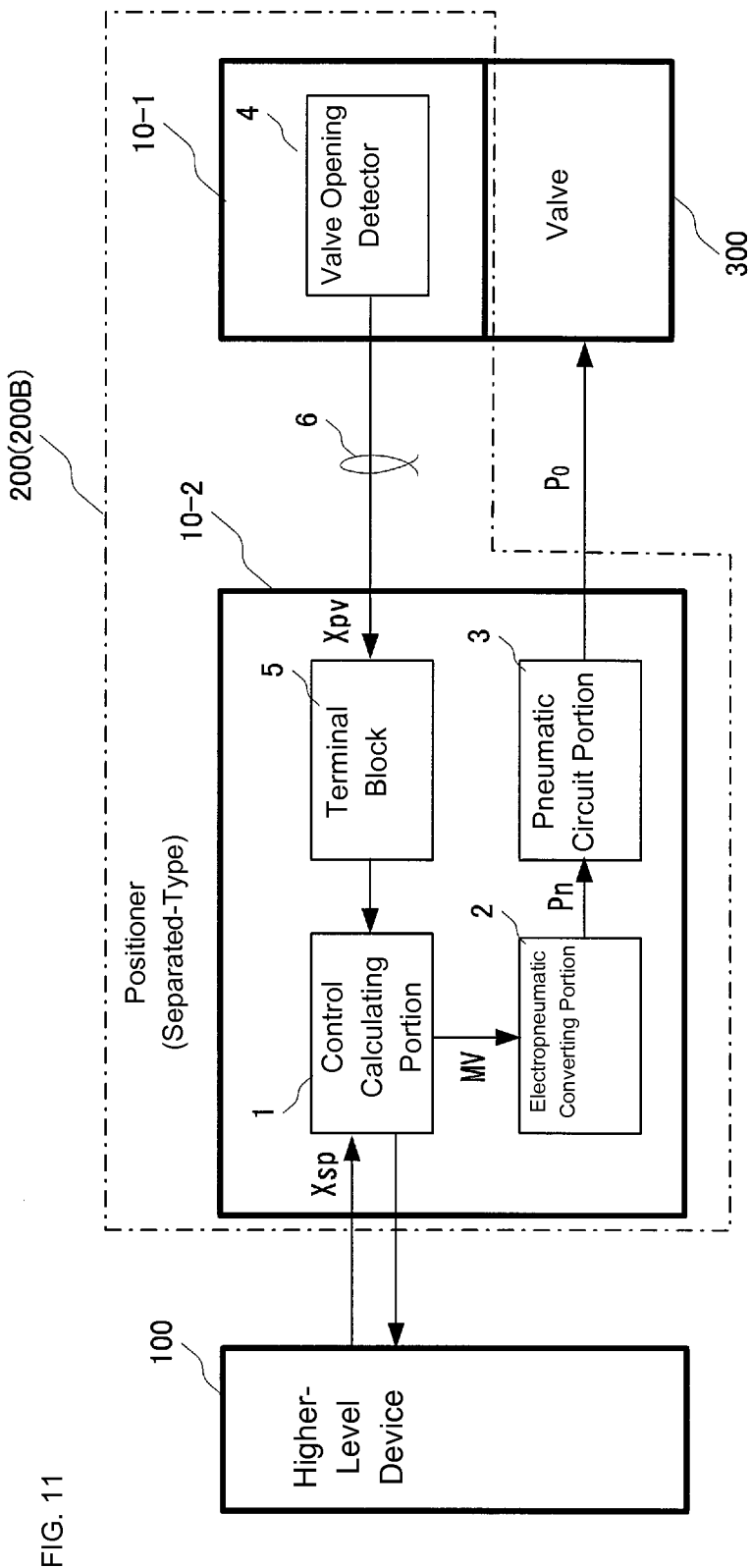
FIG. 11 is a diagram illustrating the structure in a conventional separated-type positioner.

This positioner 200 (200C) is also a separated-type positioner, like the positioner 200B illustrated in FIG. 11, where a control calculating portion 1 and a valve opening detector 4, which are a calculating system, are contained within a first case 10-1, and the electropneumatic converting portion 2 and the pneumatic circuit portion 3, which are a pneumatic system, are contained within a second case 10-2, so the calculating system and the pneumatic system are separated.

That is, in the positioner 200C, the calculating system and the pneumatic system are cut off from each other, where the calculating system is assembled together with the valve 300, and the pneumatic system is located in a position away from the valve 300. Note that in the first case 10-1 and the second case 10-2, the various components are supplied power from respective separate power supplies.

In this positioner 200C, not just the actual opening signal Xpv, from the opening detector 4, but a control signal MV from the control calculating portion 1 as well, are sent from the first case 10-1 side to the second case 10-2 side. That is, a control signal MV is sent through the cable 6 from the control calculating portion 1 that is contained within the first case 10-1 to the electropneumatic converting portion 2 that is contained within the second case 10-2.

This control signal MV that is sent through the cable 6 is a PWM signal (a pulse width modulation signal), that is, the control signal MV is a digital signal, and thus it is robust to noise.

Note that while in this example the control signal MV is sent through the cable 6 to the electropneumatic converting portion 2, that is, while the control signal MV is sent to the electropneumatic converting portion 2 through a physical cable, it may be sent via radio instead. Moreover, the control signal MV from the control calculating portion 1 need not necessarily be a digital signal, but may instead be a strong analog signal.

This separated-type (a calculating/pneumatic systems separated-type) positioner 200C also produces other effects, such as the following.

(1) Because the valve opening detector 4 and the control calculating portion 1 are assembled together into a single unit, there is no need for a long signal line for the actual opening signal Xpv that would be susceptible to the effects of noise.

(2) There is no need for noise testing on lines that would transmit minute changes, enabling noise prevention performance with countermeasures similar to those that are conventional.

(3) The development lead time is shortened and the development cost is reduced through reducing the number of issues requiring noise testing.

(4) Miniaturization is facilitated through having only the valve opening detector 4 and the control calculating portion 1, with robustness to vibration similar to that of the conventional separated type.

(5) Because the valve opening detector 4 and the control calculating portion 1 are located together, temperature correction on the valve opening detector 4 can be performed accurately.

(6) An anti-explosive structure is possible through resin molding of the valve opening detector 4 and the control calculating portion 1 alone.

(7) The electropneumatic converting portion 2 and the pneumatic circuit portion 3 can be located in a safety zone, eliminating the need for an anti-explosive structure for these parts, enabling a reduction in costs.

Another Example

Figure 2:
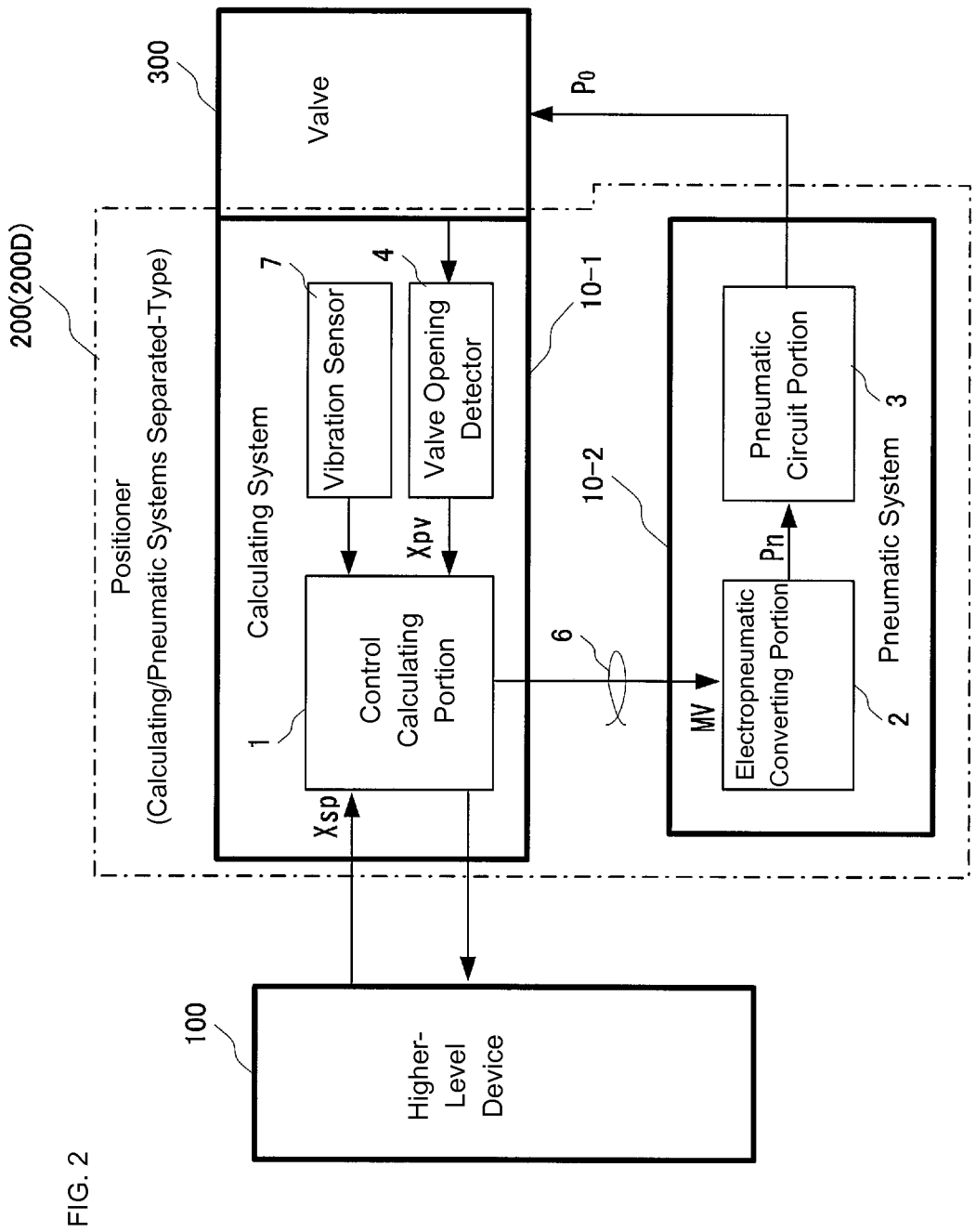
FIG. 2 is a structural diagram illustrating the critical components of Another Example of a positioner according to the present disclosure.

FIG. 2 is a structural diagram illustrating the critical components of Another Example of a positioner according to the present disclosure. In this figure, the structural elements that are identical or equivalent to the structural elements explained in reference to FIG. 1 are indicated by codes that are identical to those of FIG. 1, and explanations thereof are omitted.

In this positioner 200 (200D) according to the Another Example, in addition to the structure in the Example, a vibration sensor 7 is also contained within the first case 10-1, to detect vibrations from the valve 300 that propagate to the case 10-1 and to transmit, to the control calculating portion 1, as a detected vibration signal, the vibrations detected thereby.

Additionally, an evaluation as to whether or not there is an aberrant vibration in the valve 300 is performed in the control calculating portion 1 based on the detected vibration signal from the vibration sensor 7, and the evaluation result is sent to the higher-level device 100. These diagnostics of the valve 300, using the vibration sensor 7, make it possible to stabilize the operations in the plant and to achieve a reduction in maintenance costs. Note that the diagnostic results by the control calculating portion 1 may be, for example, displayed on the positioner 200D.

Figure 3:
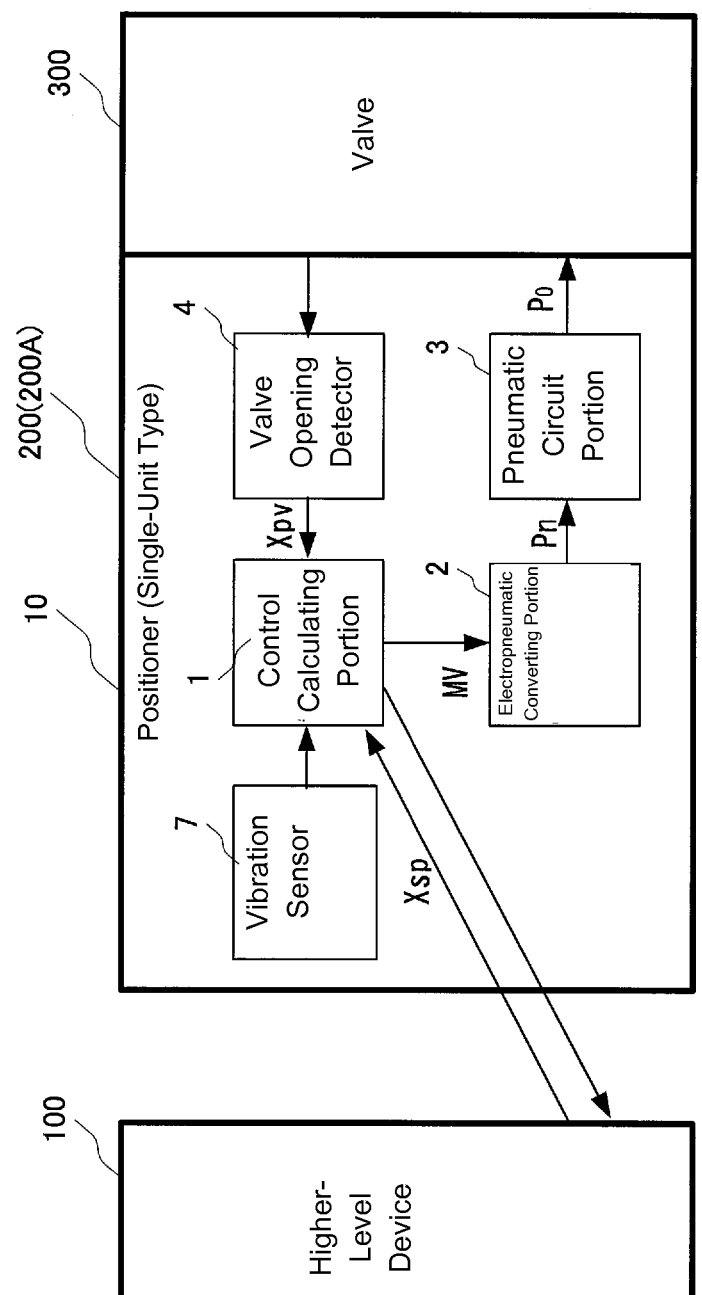
FIG. 3 is a diagram illustrating a structure for a conventional single-unit positioner that is equipped with a vibration sensor.

FIG. 3 illustrates a structure for a conventional single-unit positioner 200A that is equipped with a vibration sensor 7. When a vibration sensor 7 is equipped in the single-unit positioner 200A, the case 10 will be larger. Moreover, the location of installation of the vibration sensor 7 in the single-unit positioner 200A is away from the valve 300, preventing the vibration of the valve 300 from being observed accurately. Moreover, because the weight of the single-unit positioner 200A is increased, the positioner itself will have an impact on the vibration. Moreover, it is difficult for a single-unit positioner 200A to operate properly in an environment with a great deal of vibration.

Figure 4:
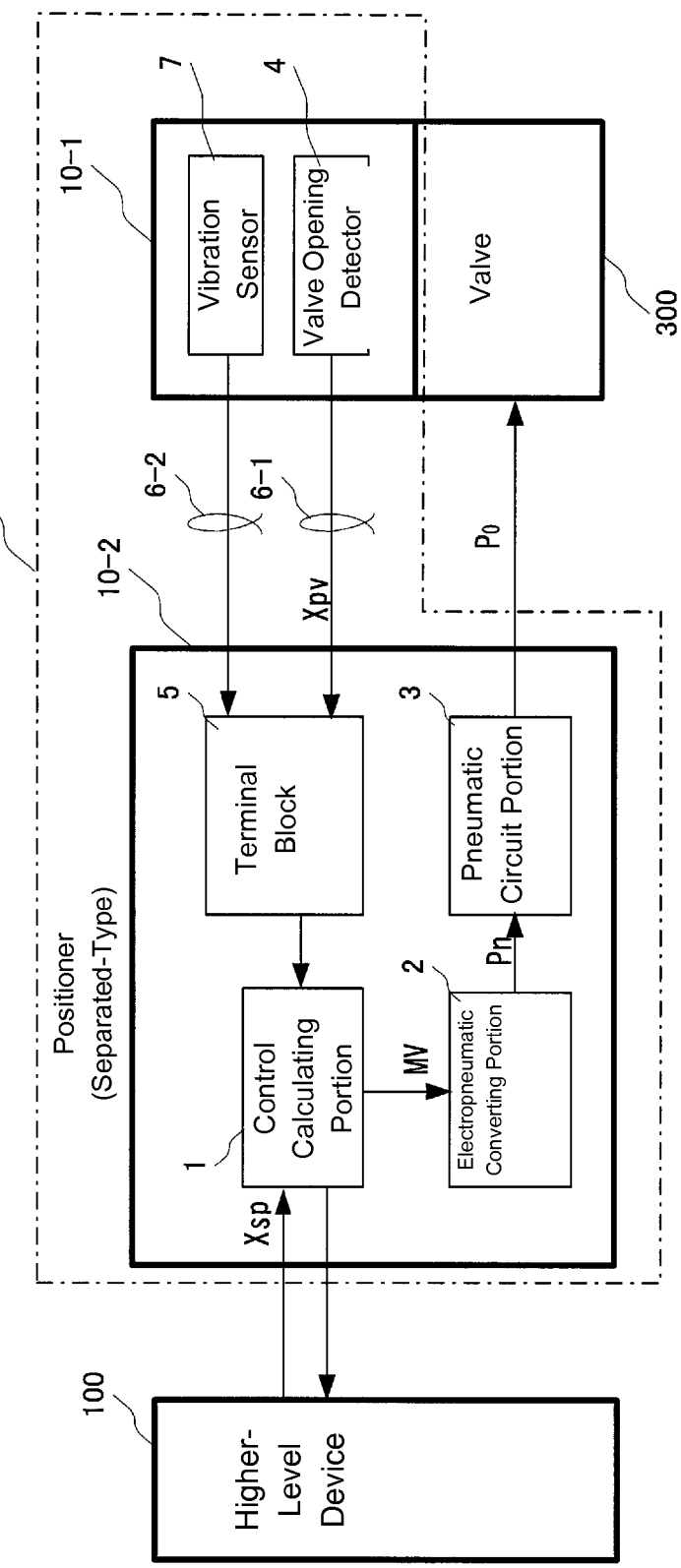
FIG. 4 is a diagram illustrating a structure for a conventional separated-type positioner that is equipped with a vibration sensor.

FIG. 4 illustrates a structure for a conventional separated-type positioner 200B that is equipped with a vibration sensor 7. Containing the valve opening detector 4 and the vibration sensor 7 within the case 10-1 enables the cases 10-1 and 10-2 to be made smaller and lighter. Moreover, the attachment of the vibration sensor 7 to the case 10-1 causes the distance to the valve 300 to be shorter, enabling the vibration of the valve 300 to be observed accurately. Moreover, because the case 10-1 that is assembled together with the valve 300 is small and light, the effects on the vibration can be reduced. However, this requires a cable 6-2, for sending the detected vibration signal from the vibration sensor 7 to the control calculating portion 1, in addition to the cable 6-1 for sending the actual opening signal Xpv from the valve opening detector 4 to the control calculating portion 1, increasing the cost of the cable, and causing not just the actual opening signal Xpv from the valve opening detector 4, but the detected vibration signal from the vibration sensor 7 also, to be susceptible to the effects of noise.

In contrast, in a positioner 200D according to the Another Example, a control calculating portion 1, a valve opening detector 4, and a vibration sensor 7, as a calculating system, are contained within a first case 10-1, enabling the same noise-resistance performance as in a single-unit positioner 200A with the control signal MV from the control calculating portion 1 to the electropneumatic converting portion 2 as a signal that is resistant to the effects of noise, such as a digital signal or a strong analog signal, with no cable between the control calculating portion 1 and the valve opening detector 4 or the vibration sensor 7.

In FIG. 5, with the conventional single-unit positioner 200A that is equipped with a vibration sensor 7 (FIG. 3) listed as "Single-Unit Type," and the conventional separated-type positioner 200B that is equipped with a vibration sensor 7 (FIG. 4) listed as "Conventional Separated Type," various attributes are compared for the case of the "Calculating/Pneumatic Separated Type" of the positioner 200D that is equipped with a vibration sensor 7 of the Another Example (FIG. 2).

Yet Another Example

Figure 6:
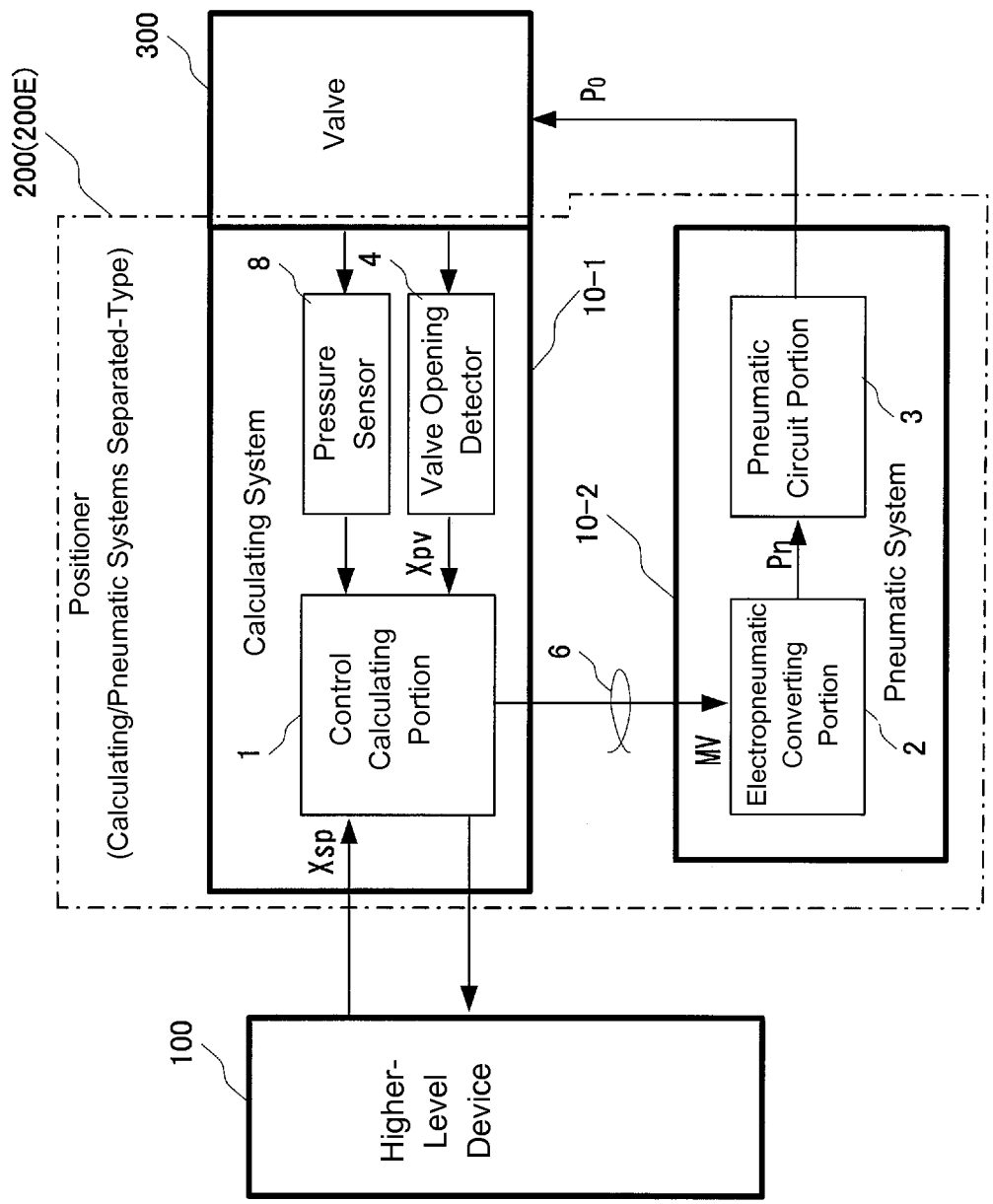
FIG. 6 is a structural diagram illustrating the critical components of Yet Another Example of a positioner according to the present disclosure.

FIG. 6 is a structural diagram illustrating the critical components of Yet Another Example of a positioner according to the present disclosure. In this figure, the structural elements that are identical or equivalent to the structural elements explained in reference to FIG. 1 are indicated by codes that are identical to those of FIG. 1, and explanations thereof are omitted.

In this positioner 200 (200E) according to the Yet Another Example, in addition to the structure in the Example, a pressure sensor 8 is also contained within the first case 10-1, to detect and output air pressure Po, outputted from the pneumatic circuit portion 3 in the valve 300 (the output air pressure Po that flows into the diaphragm chamber of an operating device) and to transmit, to the control calculating portion 1, as a detected air pressure signal, the air pressure detected thereby.

Additionally, an evaluation as to whether or not there is an aberrant air pressure inputted into the valve 300 is performed in the control calculating portion 1 based on the detected air pressure signal from the pressure sensor 8, and the evaluation result is sent to the higher-level device 100. These diagnostics of the valve 300, using the pressure sensor 8, make it possible to stabilize the operations in the plant and to achieve a reduction in maintenance costs. Note that the diagnostic results by the control calculating portion 1 may be, for example, displayed on the positioner 200E.

Figure 7:
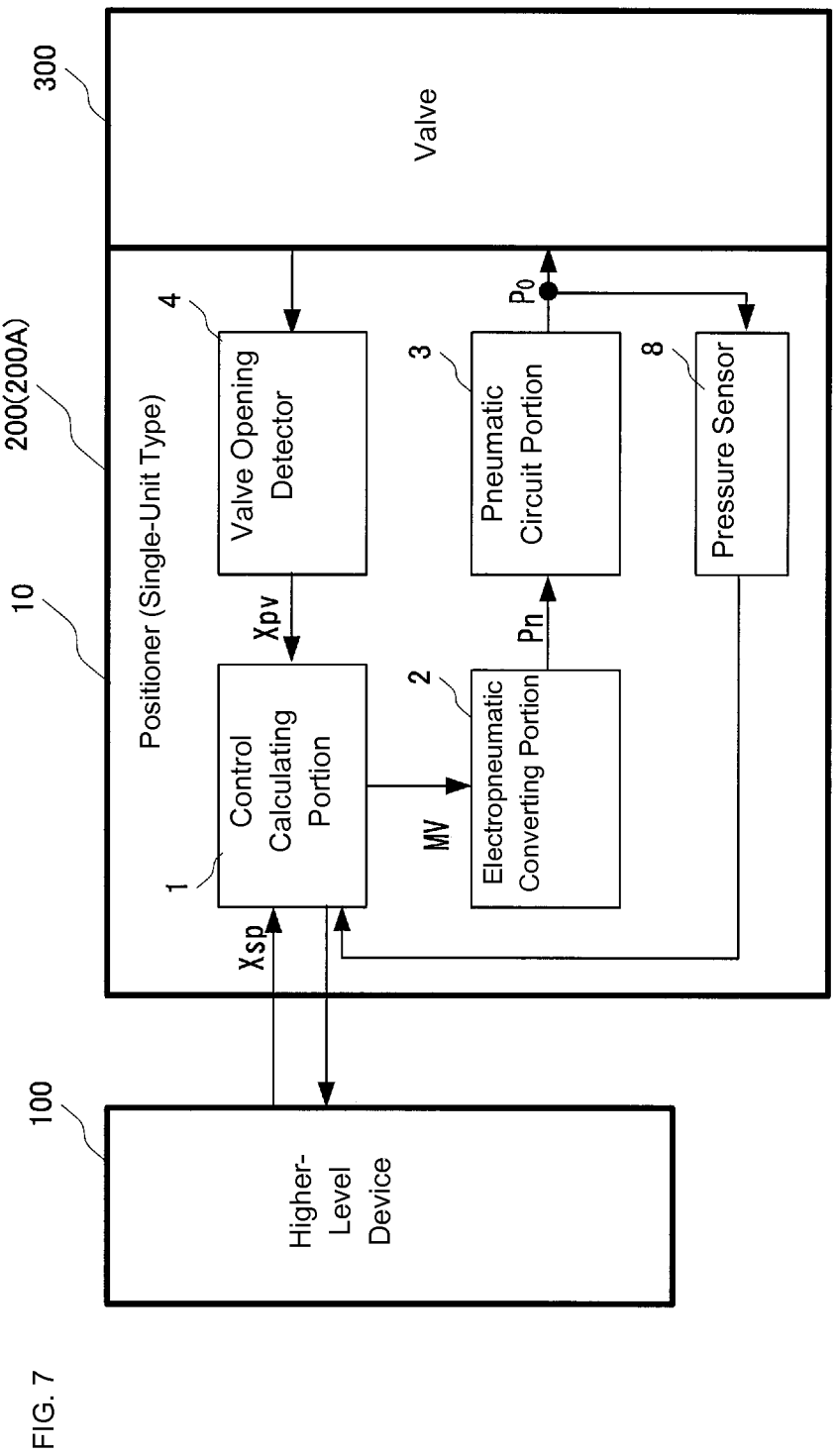
FIG. 7 is a diagram illustrating a structure for a conventional single-unit positioner 200 that is equipped with a pressure sensor.

FIG. 7 illustrates a structure for a conventional single-unit positioner 200A that is equipped with a pressure sensor 8. When a pressure sensor 8 is equipped in the single-unit positioner 200A, the case 10 will be larger. Moreover, providing the single-unit positioner 200A with a pressure sensor 8 increases the complexity of the pneumatic circuit in the pneumatic circuit portion 3, increases the flow path resistance, and reduces the process flow rate. Furthermore, this increases the complexity of the pneumatic circuit in the pneumatic circuit portion 3, damaging the accuracy of the pressure observation.

Figure 8:
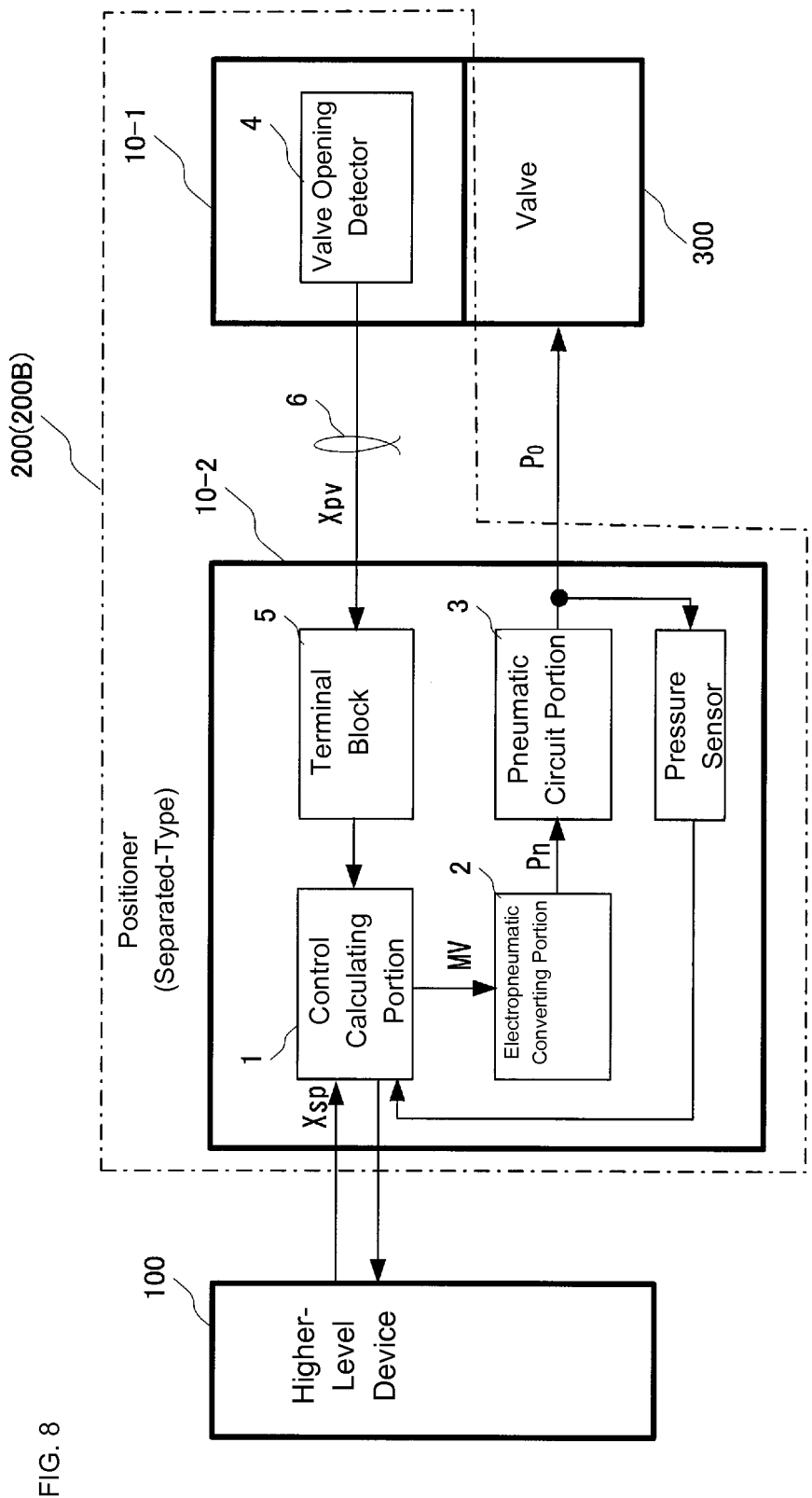
FIG. 8 is a diagram illustrating a structure for a conventional separate-type positioner that is equipped with a pressure sensor.
Figure 10:
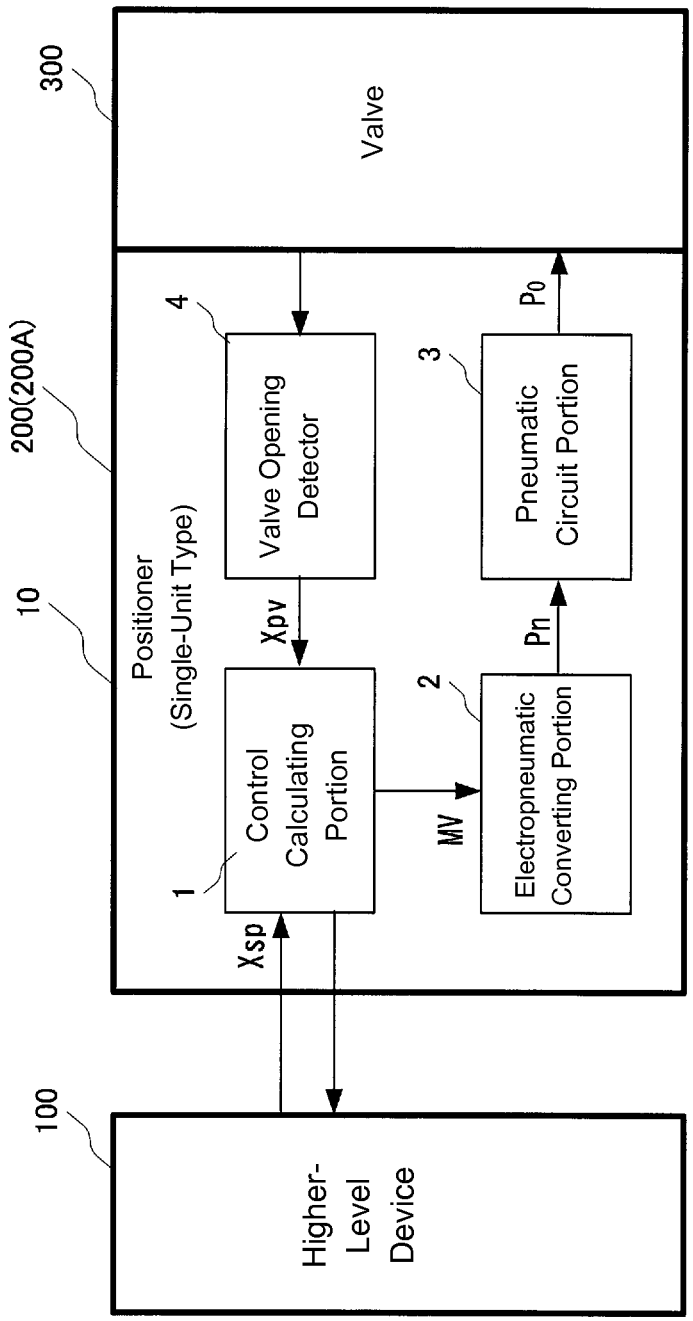
FIG. 10 is a diagram illustrating the structure in a conventional single-unit positioner 200.

FIG. 8 illustrates a structure for a conventional separated-type positioner 200B that is equipped with a pressure sensor 8. In this example, a pressure sensor 8 is contained on the case 10-2 side, so only the valve opening detector 4 is contained in the case 10-1. This reduces the size and weight of the cases 10-1 and 10-2. However, the pneumatic circuit in the pneumatic circuit portion 3 remains just as complex, and the problem of the susceptibility of the actual opening signal Xpv from the valve opening detector 4 to noise remains.

In contrast, in a positioner 200E according to the Yet Another Example, a control calculating portion 1, a valve opening detector 4, and a pressure sensor 8, as a calculating system, are contained within a first case 10-1, enabling the same noise-resistance performance as in a single-unit positioner 200A with the control signal MV from the control calculating portion 1 to the electropneumatic converting portion 2 as a signal that is resistant to the effects of noise, such as a digital signal or a strong analog signal, with no cable between the control calculating portion 1 and the valve opening detector 4. Moreover, this enables a simplification to the pneumatic circuit in the pneumatic circuit portion 3, enabling the effect on the process flow rate to be eliminated.

In FIG. 9, with the conventional single-unit positioner 200A that is equipped with a pressure sensor 8 (FIG. 7) listed as "Single-Unit Type," and the conventional separated-type positioner 200B that is equipped with a pressure sensor 8 (FIG. 8) listed as "Conventional Separated Type," various attributes are compared for the case of the "Calculating/Pneumatic Separated Type" of the positioner 200E that is equipped with a pressure sensor 8 of the Yet Another Example (FIG. 6).

Extended Examples

While the present invention has been explained above in reference to examples, the present invention is not limited to the examples set forth above. The structures and details in the present invention may be varied in a variety of ways, as can be understood by one skilled in the art, within the scope of technology in the present disclosure.

The invention claimed is:

1. A positioner comprising:
    a control calculating portion that inputs an opening setting signal for a valve, sent from a higher-level device, and an actual opening signal expressing the current opening of the valve, and generates a control signal from the opening setting signal and the actual opening signal;
    an electropneumatic converting portion that converts the control signal from the control calculating portion into an air pressure;
    a pneumatic circuit portion that uses, as an input air pressure, an air pressure that has been converted by the electropneumatic converting portion, for amplifying this input air pressure to form an output air pressure, and outputs this output air pressure to the valve;
    a valve opening detecting portion that detects the current opening of the valve to produce an actual opening signal for the control calculating portion;
    a first case that contains the control calculating portion and the valve opening detecting portion; and
    a second case that contains the electropneumatic converting portion and the pneumatic circuit portion, wherein:
    the first case is assembled together with the valve; and
    the second case is located in a position away from the valve.

2. The positioner as set forth in claim 1, comprising:
    a vibration sensor, contained within the first case, which detects and sends to the control calculating portion as a detected vibration signal, a vibration that propagates to the case, wherein:
    the control calculating portion performs diagnostics of the valve based on the detected vibration signal from the vibration sensor.

3. The positioner as set forth in claim 1, wherein
    a pressure sensor, contained within the first case, for detecting, and for sending to the control calculating portion as a detected air pressure signal, an output air pressure from the pneumatic circuit portion at the valve, wherein:
    the control calculating portion performs diagnostics of the valve based on the detected air pressure signal from the pressure sensor.

* * * * *